UNITED STATES PATENT OFFICE.

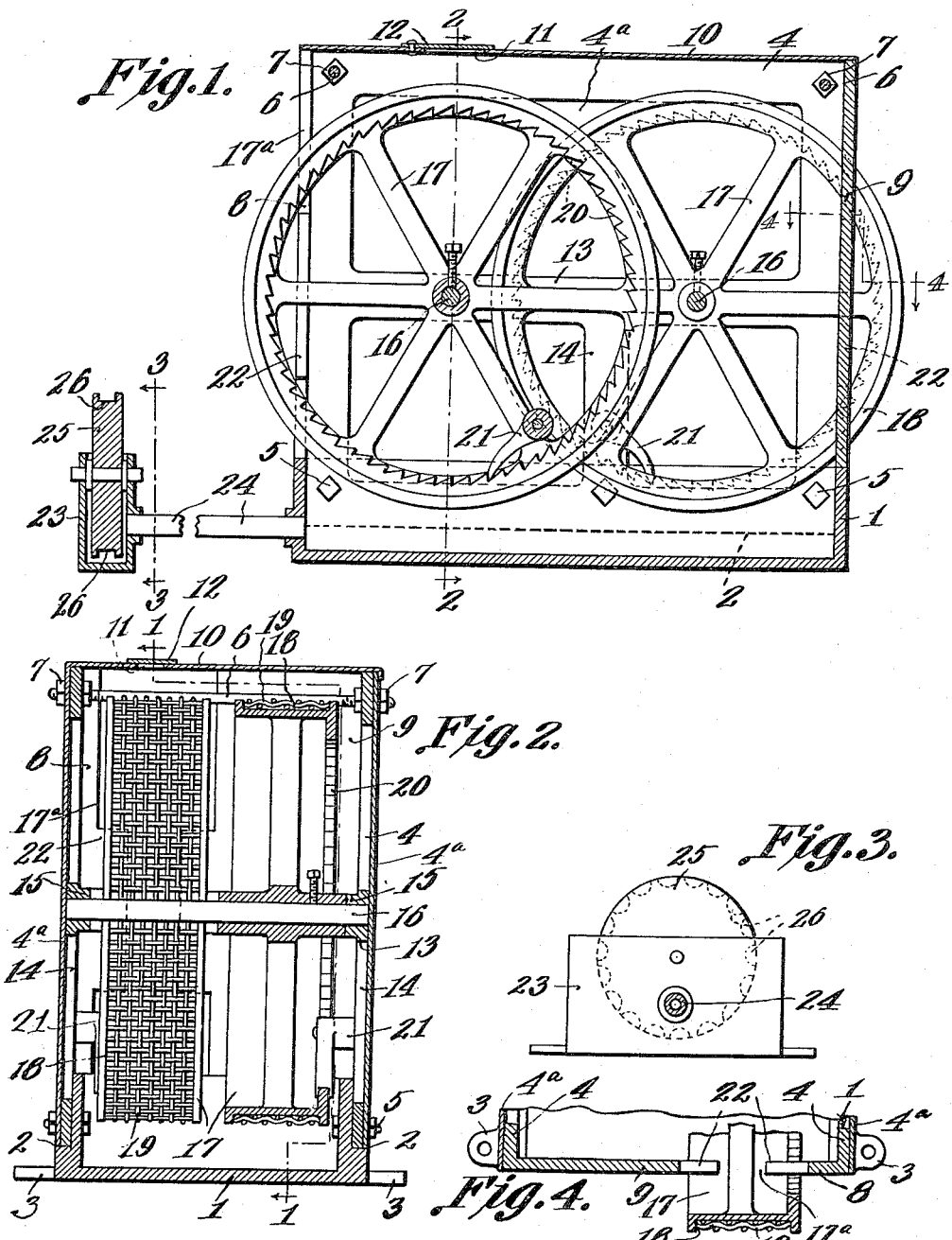

HENRY W. HOWARD, OF SHENANDOAH, IOWA.

ANIMAL-OILER.

1,156,403. Specification of Letters Patent. Patented Oct. 12, 1915.

Application filed June 11, 1914. Serial No. 844,526.

*To all whom it may concern:*

Be it known that I, HENRY W. HOWARD, a citizen of the United States, residing at Shenandoah, in the county of Page and State of Iowa, have invented a new and useful Animal-Oiler, of which the following is a specification.

The present invention appertains to a device for applying oil or any other suitable insecticide to hogs or other animals, and aims to provide a novel and improved contrivance of that nature.

The present invention contemplates the provision of an animal oiler embodying a unique assemblage of component parts, whereby the utility of the device will be enhanced, and whereby the device will be of comparatively simple and inexpensive construction, as well as being simple, practical and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawing, wherein:—

Figure 1 is a longitudinal section of the device, taken on the line 1—1 of Fig. 2. Fig. 2 is a cross section taken on the line 2—2 of Fig. 1. Figs. 3 and 4 are sectional details taken on the lines 3—3 and 4—4, respectively of Fig. 1.

In carrying out the present invention, there is provided a casing or housing, including an elongated or rectangular pan or receptacle 1 adapted to hold insecticide oil, or equivalent solution. The sides of the pan or receptacle 1 are provided with outer, longitudinal ledges 2, and are provided with lower lugs 3 adjacent the ends of the pan or receptacle for securing or anchoring the pan 1 upon a platform or other surface. The pan 1 is preferably in the form of a casting, although it may be otherwise constructed. The casing or housing also includes skeleton side frames 4, which are rectangular in contour and which have their bottom portions seated upon the ledges 2 and fitting snugly against the outer faces of the sides of the pan 1. The lower portions of the frames 4 are attached to the sides of the pan 1 by means of bolts or other securing members 5 and sheet metal panels 4ª are secured in any suitable manner to the outer faces of the side frames 4 to close the same. The frames 4 are preferably in the form of castings and are co-extensive in length with the pan or receptacle 1.

In order to connect or steady the upper portions of the frames 4, cross rods or stays 6 have their terminal portions engaged through the upper corner portions of the frames 4, and a pair of nuts 7 are threadedly mounted upon each end portion of each stay or tie rod 6, to clamp the corresponding frame 4 in place.

Each of the side frames 4 is provided at one end with an inturned angular flange 8 and at the other end with an inturned angular flange 9, the flanges 8 being relatively narrow, while the flanges 9 are relatively wide. The flange 8 of one frame 4 complements the flange 9 of the other frame, to form the end of the casing or housing, and the flanges 8 and 9 are seated upon the ends of the pan or receptacle 1.

The top 10 of the casing or housing is preferably constructed of sheet metal and is preferably integral with one of the side panels 4ª, the top 10 resting upon the upper portions of the frames 4.

For the purpose of filling the pan 1, the top 10 is provided with a filling opening 11, which is normally closed by a cover 12 pivoted upon the top 10 and swung over the filling opening 11, it being noted that when the cover 12 is swung to one side of the opening 11, the insecticide oil may be readily poured through the opening 11 into the pan 1.

The side frames 4 include longitudinal beams or bars 13 between the upper and lower portions of the frames and connecting the end members of the frames, and the said frames further include upright portions 14 connecting the beams or bars 13 and the lower portions of the frames between the ends thereof. The beams or bars 13 are provided with bearings 15 adjacent their ends, each of the beams 13 being provided with a pair of bearings 15, and the bearings at the opposite sides being in transverse alinement.

A pair of transverse shafts or axles 16 have their ends journaled within the bearings 15 at the respective end portions of the casing or housing, and rubbing wheels 17 are mounted upon the shafts or axles 16, the hubs of the wheels 17 being keyed or otherwise secured in place upon the shafts. The lower portions of the wheels 17 project into the pan or receptacle 1 and the two wheels 17 are disposed adjacent the opposite sides of the casing and have their inner portions disposed side by side, whereby the wheels rotate in spaced longitudinal planes. The outer or remote portions of the wheels 17 project beyond the ends of the casing or housing, openings 17ª being provided between the flanges 8 and 9 of the sides of the casing, through which the rims or peripheries of the wheels 17 pass. Thus, the wheels are exposed at the ends of the casing in order that the hogs or other animals may rub thereagainst.

The rims of the rubbing wheels 17 are flanged or channeled, as at 18, to hold the angular packing or wick members 19 of burlap or other absorbent material. In order to constrain the outer or exposed portions of the rubbing wheels 5 to move upwardly, the rims of the wheels 17 are provided adjacent the sides of the casing, with internal annular series of ratchet teeth 20 and the pawls or dogs 21 are pivoted to the upright portions 14 with the frames 4 and coöperate with the respective ratchet teeth 20. The ratchet teeth 20 and pawls 21 are so arranged, as to enable the outer or exposed portions of the wheels 17 to move upwardly, but restrain the wheels 17 from rotating in a reverse or retrograde direction.

The flanges 8 and 9 are preferably provided with extensions 22 projecting within the rims of the wheels 17 to partially close the openings 17ª, the rims of the wheels 17 passing around the extensions 22.

The invention also includes a supplemental or secondary oiling device embodying a relatively flat trough or receptacle 23, which is in communication of the pan 1, through the medium of a feed tube or pipe 24 having one end engaged through one end of the pan 1, and having its other end engaged through one side of the trough or receptacle 23. A comparatively small rubbing wheel 25 is trunnioned or journaled between the sides of the trough 23, and its periphery is provided with an annular series of cups or recesses 26 which are adapted to hold the insecticide therein.

In use, the pan or receptacle 1 is filled with oil or other insecticide solution or liquid, in order that the lower portions of the rubbing wheels 5 may be submerged or passed through the insecticide, whereby the absorbent rim members 19 of the rubbing wheels 17 will take up the insecticide. The insecticide will also flow through the feed pipe 24 into the trough or receptacle 23, whereby the lower portion of the rubbing wheel 25 will be submerged in the insecticide. As the hogs or other animals rub up against the exposed portions of the rubbing wheels 17 and 25, the said wheels will be rotated intermittently, and the insecticide or oil will be carried to the exposed portions of the rubbing wheels when the wheels are rotated, and consequently the insecticide will be applied to the animals, when they rub against the wheels. The present device is adapted for conveniently applying an insecticide solution to the animals, for the destruction or extermination of noxious insects, as will be obvious.

The assemblage of the several parts of the present contrivance is such, as to render the structure a thoroughly practical and convenient one in use, and to otherwise render the structure desirable, as will be obvious from the foregoing, taken in connection with the drawing, without further comment being necessary.

Having thus described the invention, what is claimed as new is:—

1. In a device of the character described, a casing including a lower pan and having an opening above the pan, and a rubbing wheel mounted for rotation within the casing above the pan, the lower portion of the rubbing wheel projecting into the pan, one portion of the rubbing wheel projecting through the said opening, the rubbing wheel having an internal series of ratchet teeth, and a pawl carried by the casing and coöperable with the said ratchet teeth so that the exposed portion of the wheel can only move upwardly.

2. In a device of the character described, a pan, side members attached to the sides of the pan and having openings between the ends thereof, the side members having bearings adjacent their ends, cross shafts having their terminals journaled in the bearings, and rubbing wheels mounted on the said shafts and having their remote portions projecting through the said openings, the lower portions of the said wheels projecting into the pan, the wheels having an internal series of ratchet teeth adjacent the side members, and pawls pivoted to the side members and coöperating with the respective ratchet teeth.

In testimony that I claim the foregoing as my own, I have hereto affixed my signature in the presence of two witnesses.

HENRY W. HOWARD.

Witnesses:
H. I. FOSKETT,
H. E. ROSS.